(12) United States Patent
Kichiya et al.

(10) Patent No.: US 12,312,988 B2
(45) Date of Patent: May 27, 2025

(54) EXHAUST PURIFICATION APPARATUS

(71) Applicant: TOKYO ROKI CO., LTD., Yokohama (JP)

(72) Inventors: Jun Kichiya, Yokohami (JP); Masaki Shimizu, Yokohami (JP)

(73) Assignee: TOKYO ROKI CO., LTD., Yokohama (JP)

( * ) Notice: Subject to any disclaimer, the term of this patent is extended or adjusted under 35 U.S.C. 154(b) by 0 days.

(21) Appl. No.: 18/570,347

(22) PCT Filed: Aug. 27, 2021

(86) PCT No.: PCT/JP2021/031535
§ 371 (c)(1),
(2) Date: Dec. 14, 2023

(87) PCT Pub. No.: WO2022/264437
PCT Pub. Date: Dec. 22, 2022

(65) Prior Publication Data
US 2024/0280040 A1   Aug. 22, 2024

(30) Foreign Application Priority Data

Jun. 17, 2021   (JP) ................ 2021-100809

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *F01N 3/035* (2013.01);
(Continued)

(58) Field of Classification Search
CPC ...... F01N 3/2066; F01N 3/035; F01N 3/2892; F01N 13/0097; F01N 2240/20;
(Continued)

(56) References Cited

U.S. PATENT DOCUMENTS

| 9,657,620 B2 | 5/2017 | Braun et al. |
| 2007/0193255 A1 | 8/2007 | Satou |

(Continued)

FOREIGN PATENT DOCUMENTS

| EP | 2119885 A1 | 11/2009 |
| JP | 2006125324 A | 5/2006 |

(Continued)

OTHER PUBLICATIONS

International Search Report and Written Opinion from counterpart PCT/JP2021/031535, dated Oct. 19, 2021.
(Continued)

*Primary Examiner* — Audrey B. Walter
(74) *Attorney, Agent, or Firm* — Harness, Dickey & Pierce, P.L.C.

(57) ABSTRACT

An exhaust purification apparatus includes: a contact device configured to bring a reducing agent into contact with exhaust gas discharged from an internal combustion engine; and a catalyst device connected to the contact device, the catalyst device having an axis extending in a first direction, the catalyst device having a catalyst to promote a reaction between the reducing agent and nitrogen oxides in the exhaust gas, the catalyst device communicating with the contact device, the contact device having an injection portion configured to inject the reducing agent into the exhaust gas, and a connecting portion of a tubular shape connecting the injection portion and the catalyst device, the connecting portion extending substantially in parallel with the first direction.

6 Claims, 12 Drawing Sheets

(51) Int. Cl.
  *F01N 3/035* (2006.01)
  *F01N 3/28* (2006.01)
  *F01N 13/00* (2010.01)
(52) U.S. Cl.
  CPC ....... *F01N 3/2892* (2013.01); *F01N 13/0097* (2014.06); *B01D 2251/2067* (2013.01); *B01D 2257/404* (2013.01); *B01D 2258/012* (2013.01); *F01N 2240/20* (2013.01); *F01N 2610/02* (2013.01); *F01N 2610/1453* (2013.01)
(58) Field of Classification Search
  CPC ......... F01N 2610/02; F01N 2610/1453; B01D 53/9418; B01D 2251/2067; B01D 2257/404; B01D 2258/012
  See application file for complete search history.

(56) References Cited

U.S. PATENT DOCUMENTS

| | | | | |
|---|---|---|---|---|
| 2010/0223916 | A1* | 9/2010 | Hayashi | F01N 13/02 60/295 |
| 2010/0257850 | A1* | 10/2010 | Kowada | F01N 3/28 60/297 |
| 2013/0064725 | A1* | 3/2013 | Kageyama | B01D 53/92 422/168 |
| 2014/0193318 | A1 | 7/2014 | Davidson et al. | |
| 2018/0080362 | A1 | 3/2018 | Kasai et al. | |
| 2020/0072110 | A1 | 3/2020 | Tomita et al. | |

FOREIGN PATENT DOCUMENTS

| | | |
|---|---|---|
| JP | 6077665 B2 | 2/2017 |
| JP | 2018145952 A | 1/2018 |
| JP | 2018044528 A | 3/2018 |
| JP | 2021001548 A | 1/2021 |
| JP | 2021071108 A | 5/2021 |
| WO | 2014063772 A1 | 5/2014 |

OTHER PUBLICATIONS

International Preliminary Report On Patentability from counterpart PCT/JP2021/031535, dated Dec. 28, 2023.
Japanese office action is related matter JP 2023-529438, Dated Nov. 18, 2024.
Extended European Search Report regarding Patent Application No. 21946111.8, dated Feb. 27, 2025.

* cited by examiner

EXHAUST PURIFICATION APPARATUS

CROSS-REFERENCE TO RELATED APPLICATIONS

This application is a 371 U.S. National Phase of International Application No. PCT/JP2021/031535, filed on Aug. 27, 2021, which claims priority to Japanese Patent Application No. 2021-100809, filed Jun. 17, 2021. The entire disclosures of the above applications are incorporated herein by reference.

TECHNICAL FIELD

The present disclosure relates to an exhaust purification apparatus.

BACKGROUND ART

Selective Catalytic Reduction (SCR) systems are known as prior art, which produce ammonia by injecting urea water into a passage of exhaust gas and thermally decompose it, and mix the ammonia with the exhaust gas, to thereby reduce nitrogen oxides (PTL 1).

CITATION LIST

Patent Literature

[PTL 1] Japanese Patent No. 6077665

SUMMARY OF INVENTION

Technical Problem

In the device described in PTL1, it is needed to arrange a urea water injection device in the direction of the axis of a catalyst and a filter, and furthermore, extend an overflow pipe in an up-down direction, which results in significant design constraints.

Solution to Problem

An aspect of the present disclosure is an exhaust purification apparatus comprising: a contact device configured to bring a reducing agent into contact with exhaust gas discharged from an internal combustion engine; and a catalyst device connected to the contact device, the catalyst device having an axis extending in a first direction, the catalyst device having a catalyst to promote a reaction between the reducing agent and nitrogen oxides in the exhaust gas, the contact device having an injection portion configured to inject the reducing agent into the exhaust gas, and a connecting portion of a tubular shape connecting the injection portion and the catalyst device, the connecting portion extending substantially in parallel with the first direction.

Advantageous Effects of Invention

According to the present disclosure, it is possible to provide an exhaust purification apparatus with fewer design constraints.

DESCRIPTION OF EMBODIMENTS

First Embodiment

The following describes a purification device 1, which is a first embodiment of an exhaust purification apparatus, with reference to FIGS. 1A to 3B. The purification device 1 performs selective catalytic reduction (SCR), in other words, injects urea water into exhaust gas, and reduces nitrogen oxides in the exhaust gas using ammonia which is a reducing agent.

Figure 1A:
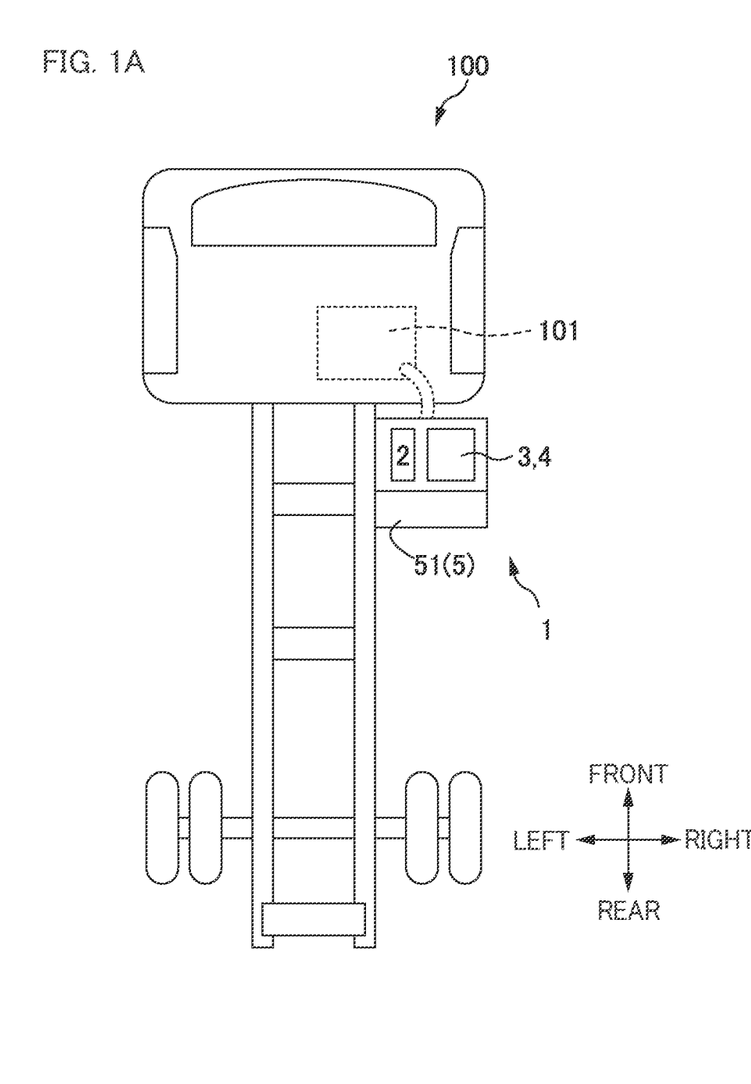
FIG. 1A is a schematic diagram of a purification device according to a first embodiment having a configuration comprising a DOC device and a DPF device.

The purification device 1 is installed at a vehicle 100 comprising a diesel engine 101, to purify the exhaust gas of the diesel engine 101. In the following description, a front-rear direction, an up-down direction, and a left-right direction of the purification device 1 are defined based on the direction of the vehicle 100, as illustrated in FIG. 1.

The purification device 1 mainly comprises a DOC device 2 with a diesel oxidation catalyst (DOC), a DPF device 3, a contact device 4, and an SCR catalyst device 5 having an SCR catalyst 51. As illustrated in FIG. 1A, the DOC device 2 and the DPF device 3 are arranged side by side in the left-right direction of the vehicle 100. These devices are connected through piping or housing, and their internal spaces are connected (hereinafter also referred to as communicating). The exhaust gas of the diesel engine 101 passes through the devices in the order of the DOC device 2, the DPF device 3, the contact device 4, and the SCR catalyst device 5.

Figure 1B:
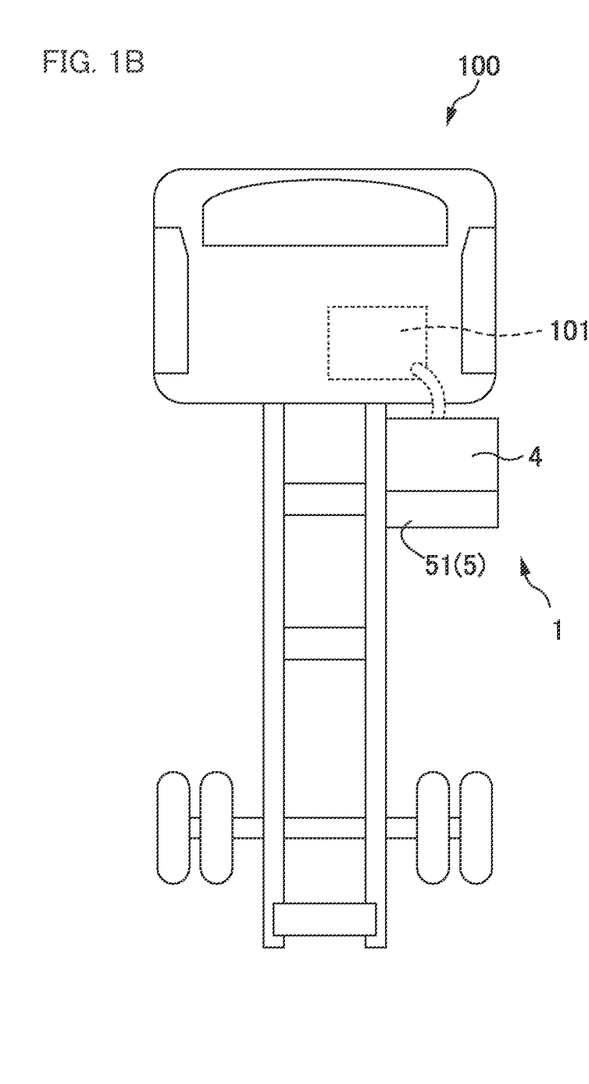
FIG. 1B is a schematic diagram of a purification device according to a first embodiment having a configuration in which a DOC device and a DPF device are omitted.

As illustrated in FIG. 1B, the purification device 1 may have a configuration in which the diesel engine 101 and the SCR catalyst device 5 are connected through the contact device 4, without comprising the DOC device 2 or the DPF device 3. However, the following describes assuming a configuration (FIG. 1A) comprising the DOC device 2 and the DPF device 3, unless otherwise specified.

Figure 2A:
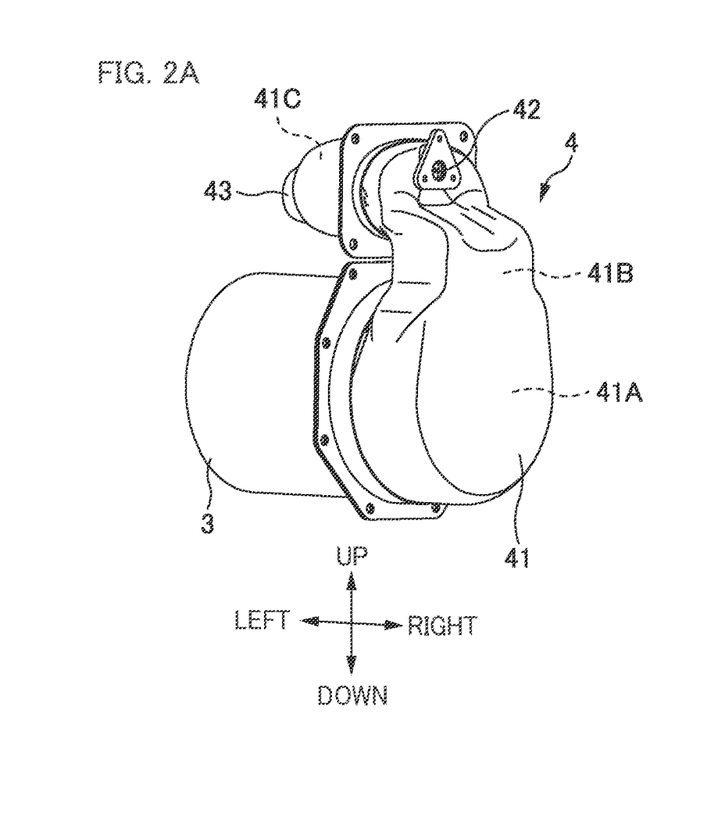
FIG. 2A is perspective view of a contact device and a DPF device according to a first embodiment.
Figure 2B:
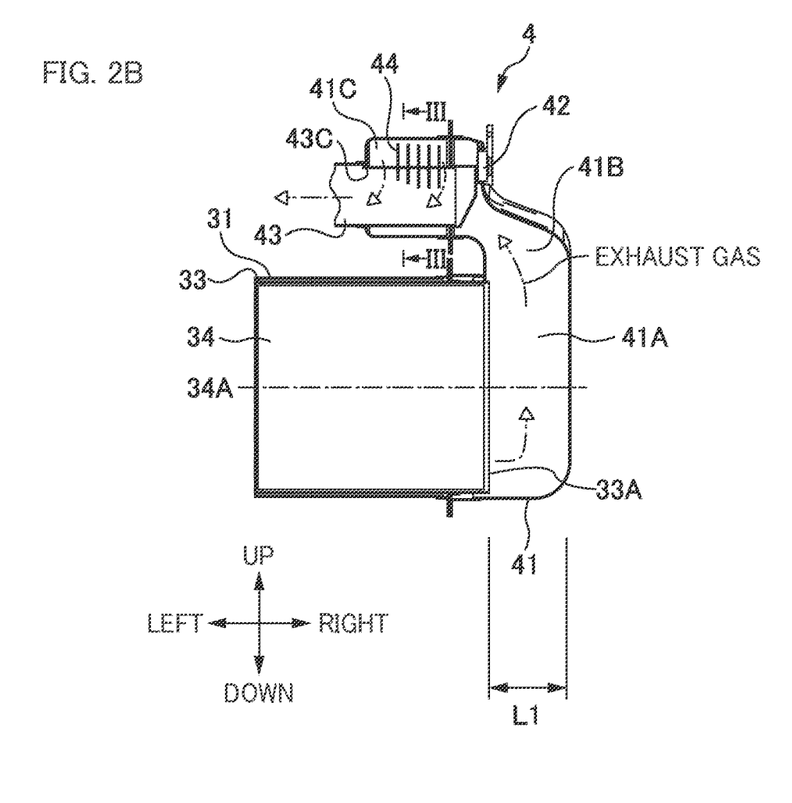
FIG. 2B is a cross section of a contact device and a DPF device according to a first embodiment.

As illustrated in FIGS. 2A and 2B, the DPF device 3 comprises a case 31, a shell 33, and a diesel particulate filter (DPF) 34.

The case 31 is a housing configured to house the shell 33 and the DPF 34, and is a substantially cylindrical member having an axis extending in the left-right direction.

The shell 33 is formed into a substantially cylindrical shape having an axis extending in the left-right direction. The shell 33 is a cylindrical member having a diameter smaller than that of the case 31, and is housed inside the case 31. The right end portion of the shell 33 forms a discharge portion 33A having an opening to discharge the exhaust gas having passed through the DPF 34 therethrough.

The DPF 34 is a filter to collect a fine particle component in the exhaust gas and remove it therefrom, and has a cylindrical shape having an axis 34A. The DPF 34 is removably housed inside the shell 33 such that the axis 34A is directed in the left-right direction.

The contact device 4 has a function of bringing the urea water, which is a reducing agent, into contact with the exhaust gas discharged from the DPF device 3, and further, guiding the exhaust gas toward the SCR catalyst device 5. As illustrated in FIG. 2B, the contact device 4 comprises a case 41, an injection device 42, an overflow pipe 43, and a plurality of the baffle plates 44.

The case 41 is a housing forming the outer shell of the contact device 4, and the case 41 is attached to cover the right side of the case 31. The interior of the case 41 is formed hollow to guide the exhaust gas. Specifically, inside the case 41, there are formed a lower chamber 41A, a middle chamber 41B provided thereabove, and an upper chamber 41C provided above the middle chamber 41B. These chambers 41A, 41B, and 41C communicate with each other, and are able to sequentially guide the exhaust gas discharged from the discharge portion 33A to the above, as given by arrows in FIG. 2A.

The lower chamber 41A is a chamber through which the exhaust gas discharged from the discharge portion 33A passes first, and is formed on the right side with respect to the case 31, to communicate with the discharge portion 33A.

The upper chamber 41C is a chamber formed in the upper portion of the case 41. In the upper chamber 41C, the urea water is injected into the exhaust gas and the exhaust gas is guided to the overflow pipe 43.

The middle chamber 41B is formed between the lower chamber 41A and the upper chamber 41C, and has a function of controlling the flow direction of the exhaust gas and guiding the exhaust gas from the lower chamber 41A to the upper chamber 41C.

The injection device 42 is fixed to the upper end portion of the case 41, and has a function of injecting the urea water leftward into the upper chamber 41C. The injection device 42 is located above the overflow pipe 43, and injects the urea water to above the overflow pipe 43.

Figure 3A:
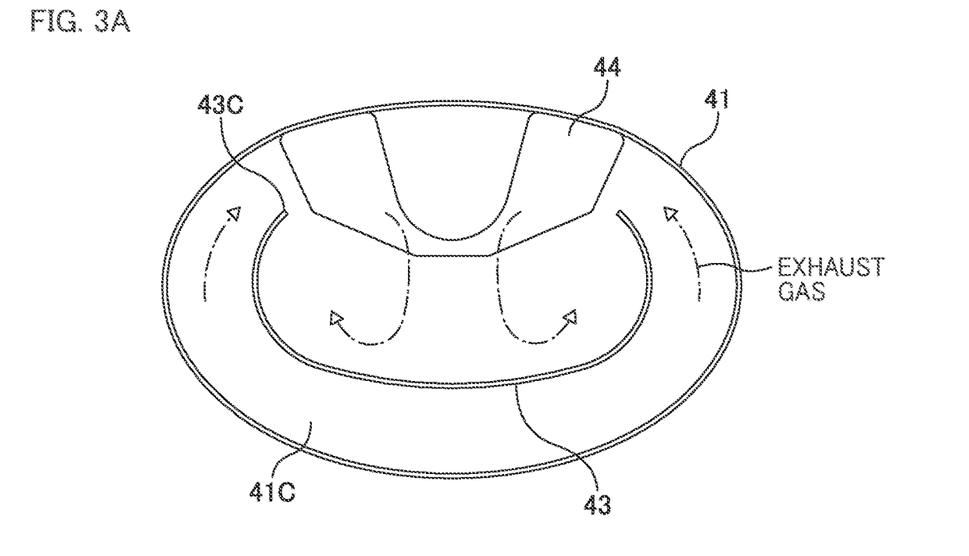
FIG. 3A is a cross section taken along line III-III of FIG. 2B.

The overflow pipe 43 is a tubular member extending in the left-right direction, and has a cross section of a substantially oval compressed in the up-down direction as illustrated in FIG. 3A. As illustrated in FIG. 2B, the overflow pipe 43 is provided so as to extend leftward from the top of the case 41, and has a function of guiding the exhaust gas to the SCR catalyst device 5.

The right end portion of the overflow pipe 43 is arranged inside the upper chamber 41C. An opening 43C is formed in the upper face of the right end portion of the overflow pipe 43, and the inside of the overflow pipe 43 and the upper chamber 41C communicate with each other through the opening 43C. As illustrated in FIG. 2B, within the upper chamber 41C, 10 space is formed between the outer circumference of the overflow pipe 43 and the inner surface of the case 41.

Figure 3B:
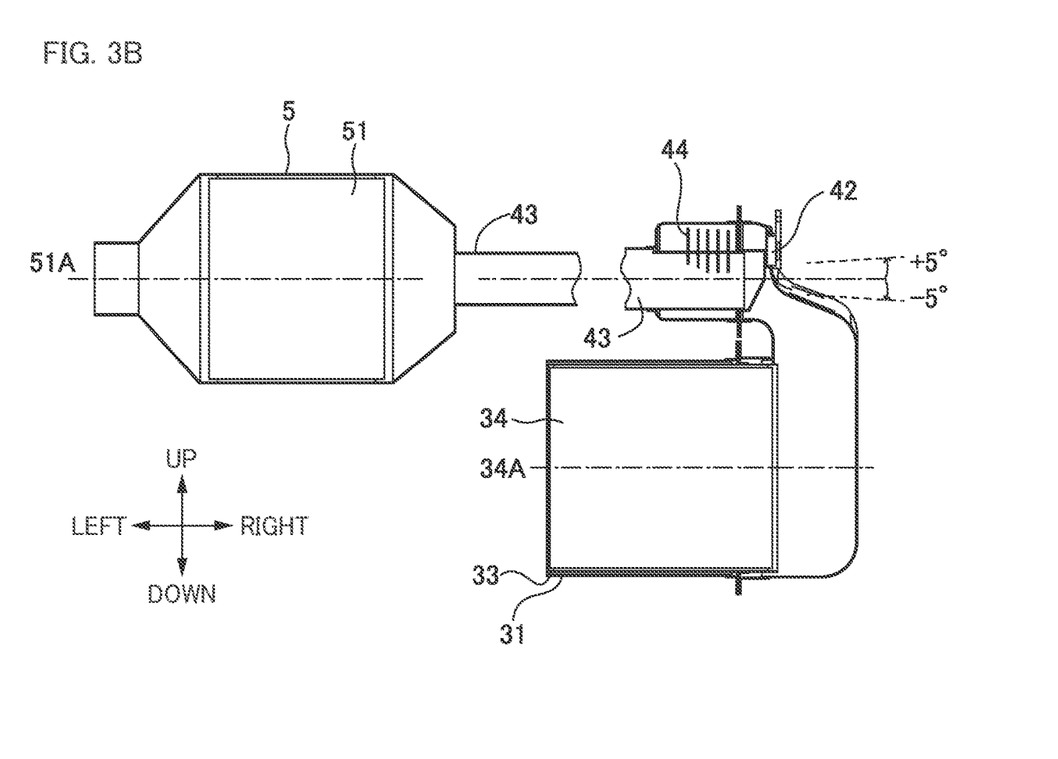
FIG. 3B is a diagram illustrating an arrangement of an SCR catalyst device, a DPF device, and an overflow pipe.

A baffle plate 44 is a plate-shaped member extending in the front-rear direction and the up-down direction, and is fixed to the upper part of the case 41. A plurality of baffle plates 44 are arranged in and above the opening 43C so as to be aligned in the left-right direction. The lower end of each of the baffle plates 44 is located inside the overflow pipe 43, and forms a space with the inner surface of the overflow pipe 43 (FIGS. 3A and 3B).

The SCR catalyst device 5 is connected to the overflow pipe 43. The SCR catalyst device 5 supplied with the exhaust gas from the overflow pipe 43, and has a function of promoting the reduction reaction of nitrogen oxides using the ammonia by virtue of the SCR catalyst 51. The SCR catalyst 51 is a cylindrical member (FIG. 3B) having a horizontally extending axis 51A.

As described above, the overflow pipe 43 is arranged so as to be parallel with the axes 51A and 34A. However, in modification examples and embodiments including those described below, the direction in which the overflow pipe 43 extends can be at an angle within a range of ±5 degrees with respect to at least one of the axis 51A or the axis 34A (FIG. 3B, the upper side is positive). Similarly, in modification examples and embodiments including those described below, the direction in which the overflow pipe 43 extends can be not only in the horizontal direction but also at an angle within a range of ±5 degrees with respect to the horizontal direction.

Herein, when the absolute value of the angle formed by the overflow pipe 43 with respect to the axis 51A or 34A is 5 degrees or smaller, the overflow pipe 43 is described as being "substantially parallel" with the axis 51A or 34A. The overflow pipe 43 can form a crossing angle with respect to the axis 51A or 34A so as to be in a direction other than the up-down direction, such as the horizontal direction, for example. In addition, when the direction in which the overflow pipe 43 extends is at an angle within a range of ±5 degrees with respect to the horizontal direction, it is described as being "substantially horizontal".

Exhaust Gas Purification

The following describes the purification of the exhaust gas in the purification device 1. The DOC device 2 oxidizes the nitrogen oxides (NOx) in the exhaust gas. Thereafter, while the exhaust gas is passing through the DPF device 3, the DPF 34 collects a fine particle component in the exhaust gas and removes it therefrom. The exhaust gas is discharged from the right end face of the DPF 34, passes through the discharge portion 33A, and enters the contact device 4.

The exhaust gas having entered the contact device 4 passes through the lower chamber 41A, the middle chamber 41B, and the upper chamber 41C in this order. Inside the upper chamber 41C, the exhaust gas goes around the outside of the overflow pipe 43 and enters the overflow pipe 43 through the opening 43C. In this event, the exhaust gas flows along the outer circumference of the overflow pipe 43, to thereby produce such two symmetrical flows as to swirl (hereinafter referred to as "swirling flows"), and flows, in the overflow pipe 43, toward the SCR catalyst device 5, while maintaining these swirling flows (FIGS. 2B, 3A). The baffle plates 44 and the overflow pipe 43 are heated from the inside and outside of the pipe with the moving exhaust gas.

The middle chamber 41B is located below the upper chamber 41C and the overflow pipe 43, and thus when moving from the middle chamber 41B, the exhaust gas moves in a direction intersecting the direction in which the overflow pipe 43 extends. Thus, the flow velocity of the exhaust gas is unlikely to decrease, thereby being able to produce the swirling flows efficiently. This facilitates mixing the exhaust gas with the ammonia and urea water and stirring them.

At the same time, the urea water is injected from the injection device 42 in the upper chamber 41C. The urea water hits the baffle plates 44, and enters the overflow pipe 43 from the opening 43C together with the exhaust gas. Urea contained in the urea water is heated with the baffle plates 44 or the overflow pipe 43, to thereby produce ammonia. The ammonia and the exhaust gas are mixed and stirred with the swirling flows of the exhaust gas.

Since the exhaust gas moves around the overflow pipe 43, the overflow pipe 43 is easily heated, thereby facilitating the production of the ammonia by heating the urea water. In other words, the urea water adhering to the inside of the overflow pipe 43 is efficiently heated, thereby being able to easily produce the ammonia. Further, such a possibility is reduced that the urea water stays inside the overflow pipe 43 without producing the ammonia and urea crystals are formed and adhere.

The exhaust gas having passed through the overflow pipe 43 reaches the SCR catalyst device 5. In the SCR catalyst device 5, the reduction of nitrogen oxides in the exhaust gas with ammonia is promoted by the SCR catalyst 51. As a result, the nitrogen oxides in the exhaust gas is reduced to nitrogen.

First Modification Example

Figure 4A:
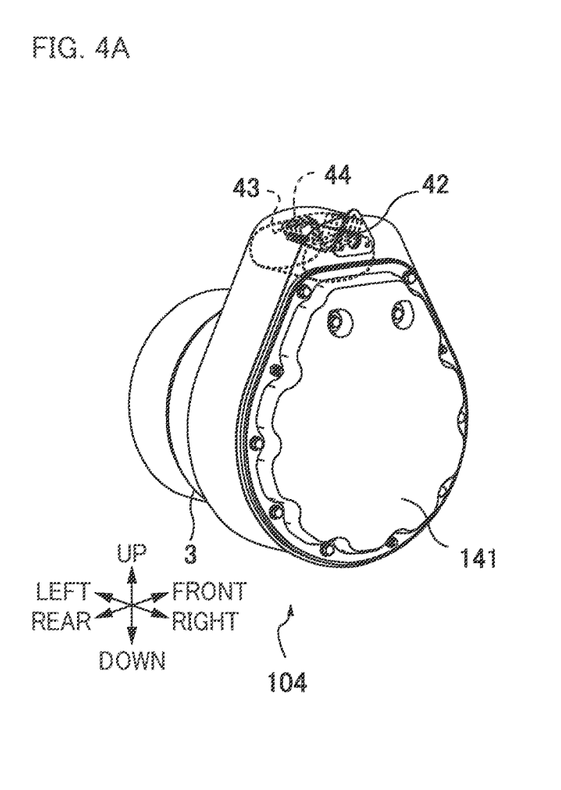
FIG. 4A is a perspective view of a contact device and a DPF device according to a first modification example.
Figure 4B:
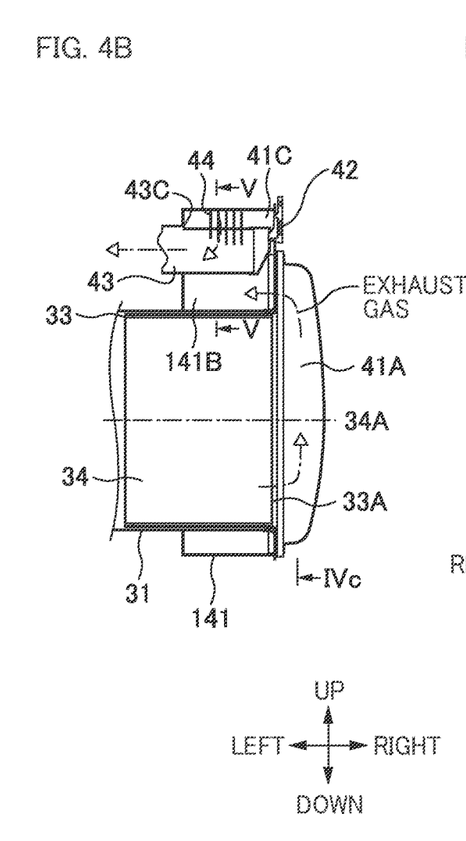
FIG. 4B is a cross section of a contact device and a DPF device according to a first modification example.
Figure 4C:
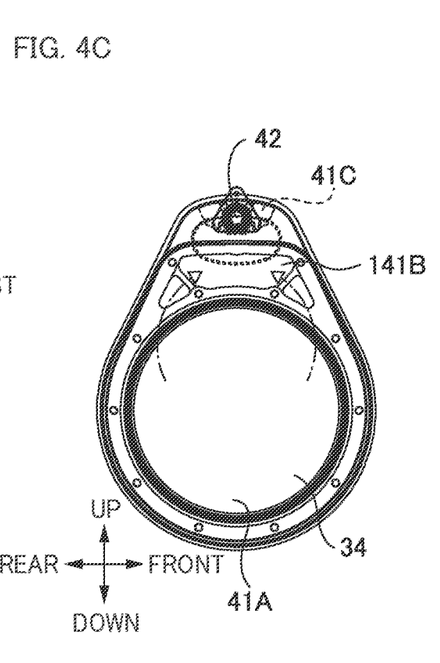
FIG. 4C is a cross section taken along line IVc of FIG. 4B.

Note that the shape and dimensions of the middle chamber are not limited to those illustrated in FIGS. 2 and 3, and may be various shapes and dimensions. FIGS. 4A to 4C illustrate a contact device 104 in a first modification example. Note that, hereinafter, devices, members, and the like having the same configuration as those in the first embodiment will be given the same reference numbers as those in the first embodiment, and the descriptions thereof are omitted.

The contact device 104 comprises a case 141. The middle chamber 141B formed in the case 141 is located between the overflow pipe 43 and the case 31, and is formed so as to extend in the left-right direction. The length in the left-right direction of a middle chamber 141B is substantially the same as the length in the left-right direction of the opening 43C.

Figure 5:
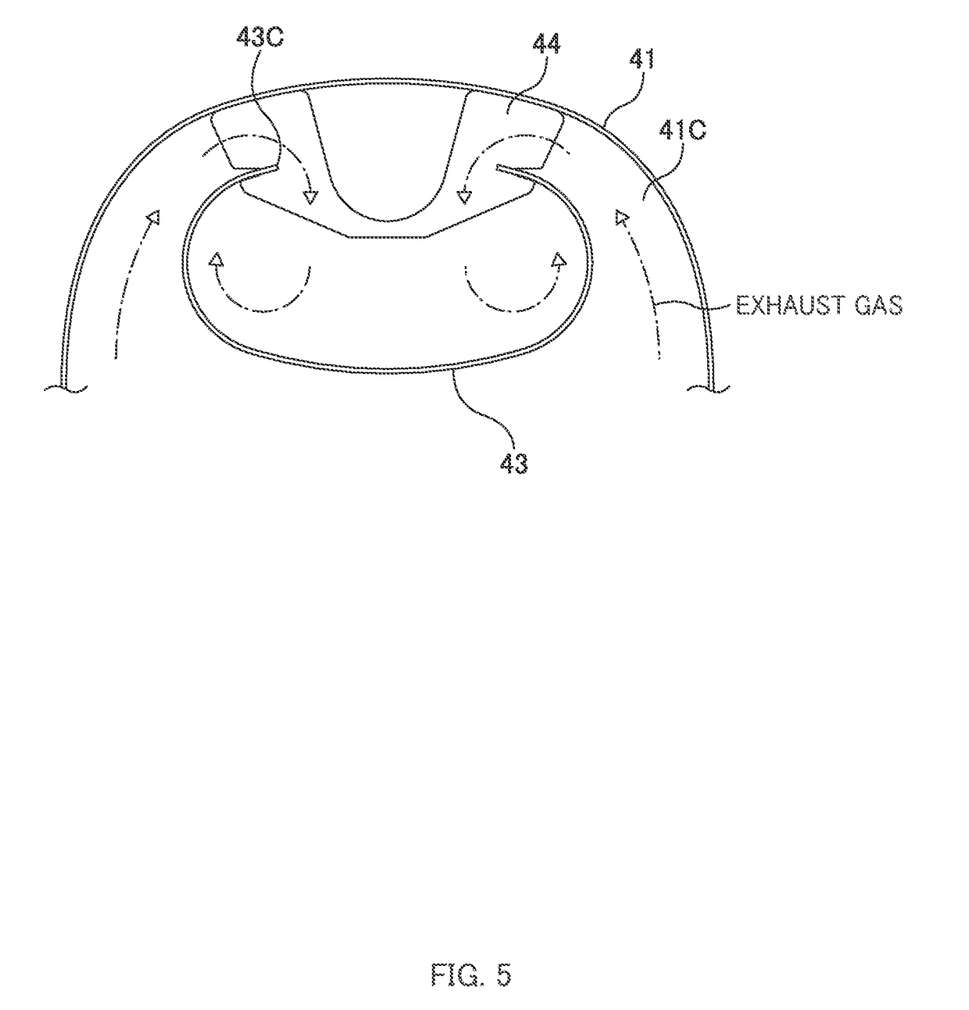
FIG. 5 is a cross section taken along line V-V of FIG. 4B.

The middle chamber 141B is located below the upper chamber 41C and the overflow pipe 43, and thus when moving from the middle chamber 141B to the upper chamber 41C, the exhaust gas moves in a direction substantially orthogonal to the overflow pipe 43, in other words, moves directly above, as given by the arrows in FIGS. 4B and 5.

Since the exhaust gas moves around the overflow pipe 43 over a wide area, the overflow pipe 43 is easily heated, thereby facilitating the production of the ammonia by heating the urea water. In other words, the urea water adhering to the inside of the overflow pipe 43 is efficiently heated, thereby being able to easily produce the ammonia. Further, such a possibility is reduced that the urea water stays inside the overflow pipe 43 without producing the ammonia and that urea crystals are formed and adhere thereto.

Since the exhaust gas moves in the direction intersecting with the overflow pipe 43, preferably, in the direction orthogonal thereto, the flow velocity of the exhaust gas is unlikely to decrease, thereby being able to produce the swirling flows efficiently. This facilitates mixing the exhaust gas with the ammonia and urea water and stirring them.

Second Modification Example

FIGS. 6A to 6D illustrate a contact device 204 in a second modification example. In a case 241 of the contact device 204, a flow path 241D provided outside the case 31 in the radial direction is formed, in addition to the lower chamber 41A, the middle chamber 241B, and the upper chamber 41C.

Figure 6A:
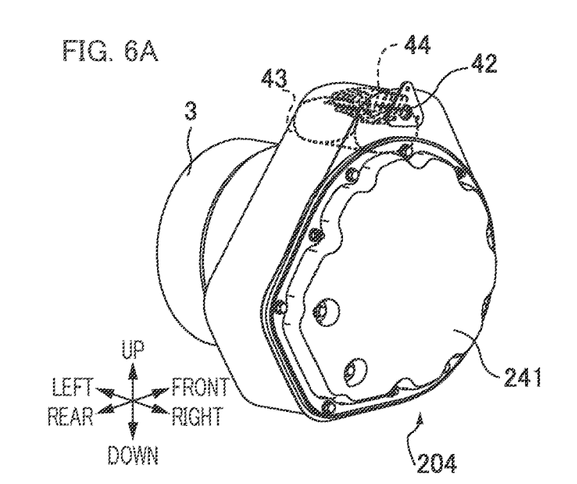
FIG. 6A is a perspective view of a contact device and a DPF device according to a second modification example.
Figure 6B:
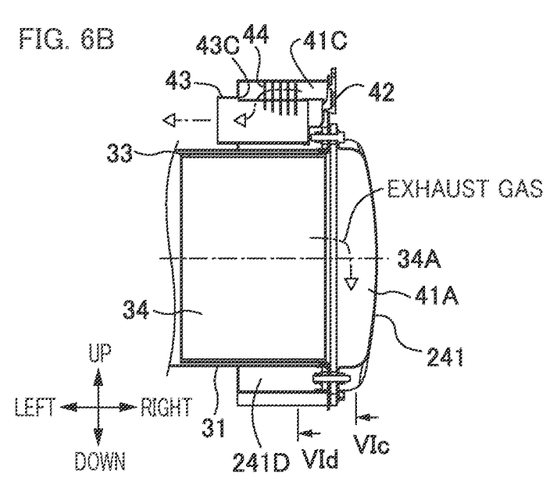
FIG. 6B is a cross section of a contact device and a DPF device according to a second modification example.

The middle chamber 241B is a space formed so as to extend in the left-right direction, and is located at a position other than a position above the case 31, such as a position in front of or behind the case 31. Further, the middle chamber 241B is formed below the axis 34A. Since the middle chamber 241B is not located above the case 31, the height dimension of the contact device 204 can be made smaller than that of the contact device 104 in the first modification example.

The flow path 241D is a space formed between the outer peripheral surface of the case 31 and the inner peripheral surface of the case 241, and connects the middle chamber 241B and the upper chamber 41C.

Figure 6C:
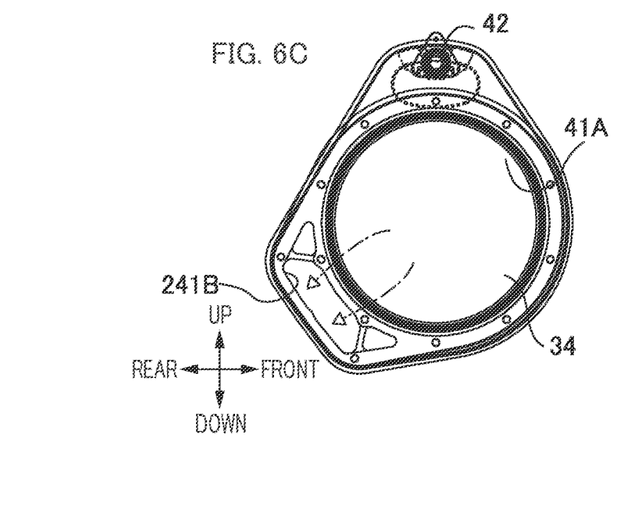
FIG. 6C is a cross section taken along line VIc of FIG. 6B.
Figure 6D:
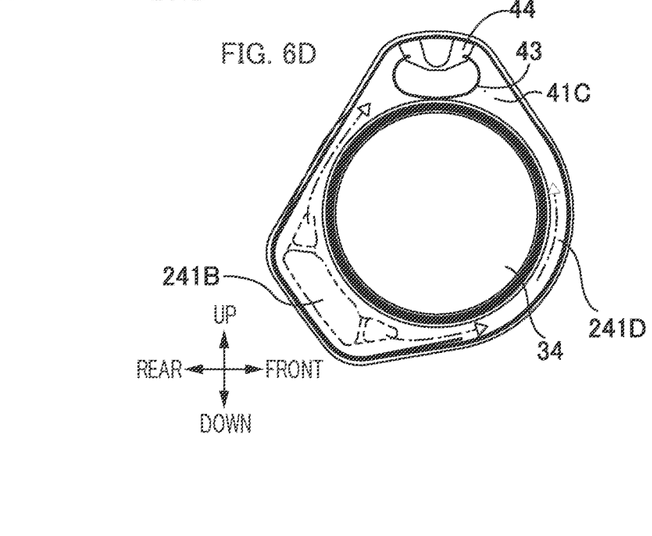
FIG. 6D is a cross section taken along line VId of FIG. 6B.

The exhaust gas moves diagonally downward from the lower chamber 41A, and enters the middle chamber 241B, as given by the arrows in FIGS. 6B and 6C. Further, the exhaust gas is divided into two streams and the divided exhaust gas passes through the flow path 241D, and flows into the upper chamber 41C while producing upward streams (FIG. 6D). The exhaust gas flows into the overflow pipe 43 while producing the swirling flows in the upper chamber 41C.

The movements of the exhaust gas within the upper chamber 41C and the injection of the urea water are as in the first embodiment. In other words, even with such a configuration, it is possible to obtain the same effects as in the first embodiment, while suppressing the height of the device.

Third Modification Example

Figure 7A:
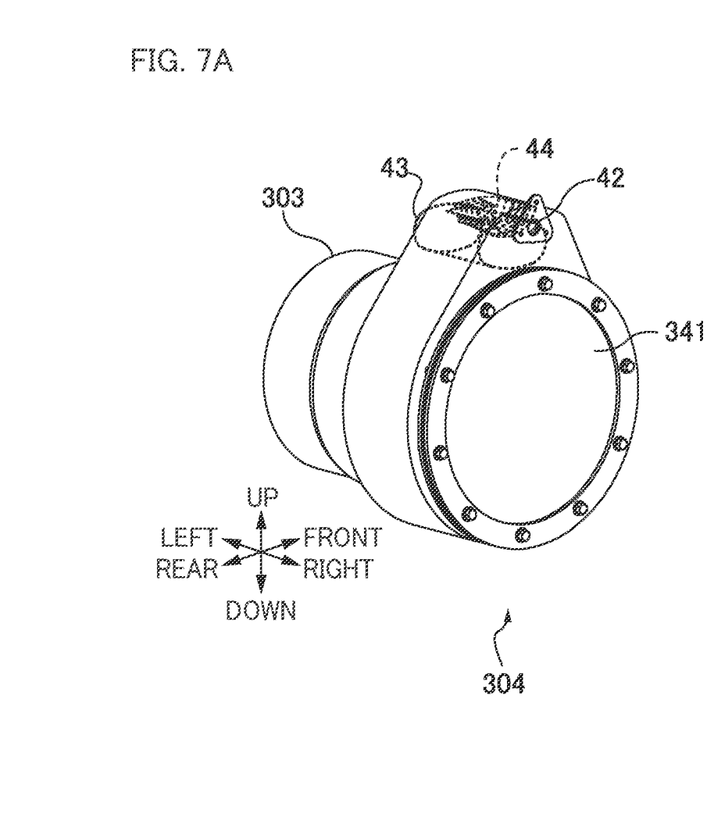
FIG. 7A is a perspective view of a contact device and a DPF device according to a third modification example.
Figure 7B:
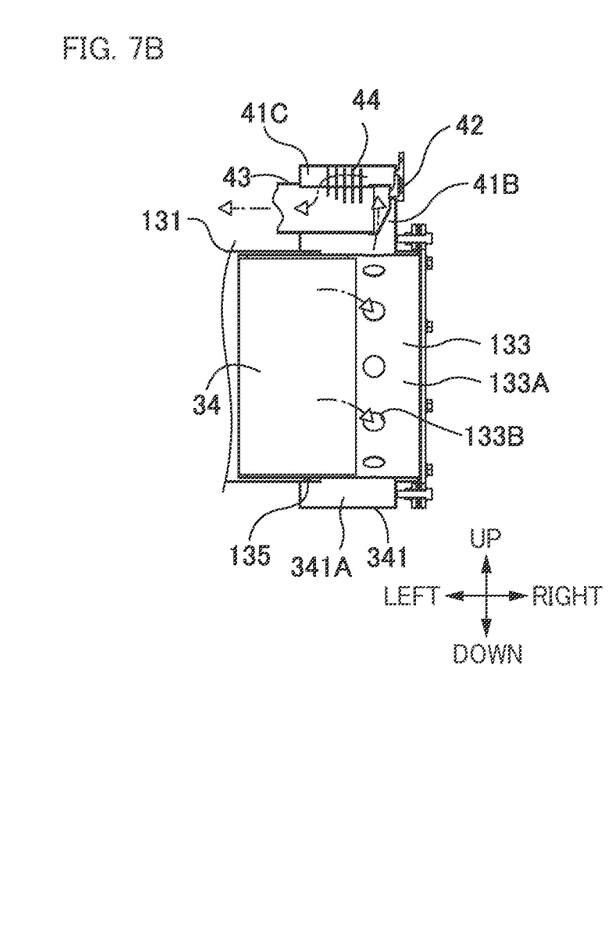
FIG. 7B is a cross section of a contact device and a DPF device according to a third modification example.

FIGS. 7A and 7B illustrate a DPF device 303 and a contact device 304 in a third modification example. The DPF device 303 has a case 31, a shell 133, the DPF 34, and a gasket 135. The space between the outer circumferential surface of the shell 133 and the inner circumferential surface of the case 31 is closed by a gasket 135, to thereby prevent leakage of the exhaust gas. Further, the contact device 304 has a case 341.

The shell 133 is a substantially cylindrical member, and the right end face of the shell 133 contacts the case 341. In the discharge portion 133A, a plurality of openings 133B penetrating the side wall of the shell 133 are formed to be aligned in the circumferential direction. The exhaust gas can flow to the outside of the shell 133 in the radial direction by passing through the plurality of openings 133B.

A lower chamber 341A defined by the outer peripheral surface of the shell 133 and the inner peripheral surface of the case 341 is formed outside the shell 133 in the radial direction. The lower chamber 341A is different from the lower chamber 41A of the first embodiment, and is formed in a ring shape when viewed in the left-right direction. The lower chamber 341A communicates with the middle chamber 41B in the upper part of the lower chamber 341A.

The exhaust gas discharged from the discharge portion 133A is guided to the lower chamber 341A, the middle chamber 41B, and the upper chamber 41C, and then moved upward. Thereafter, as in the first embodiment and the first modification example, the exhaust gas moved upward flows into the overflow pipe 43 while producing the swirling flows in the upper chamber 41C.

Even with such a configuration, it is possible to reduce the lengths in the left-right direction of the DPF device 303 and the contact device 4, thereby being able to achieve a compact configuration. In particular, since the right end part of the shell 133 can be brought into contact with the case 341, the dimension in the left-right direction of the case 341 can be reduced.

In the first embodiment, the overflow pipe 43 is arranged such that the extending direction thereof is substantially parallel to the axis direction of the DPF 34. However, as will be given in a second embodiment below, the overflow pipe 43 may be arranged such that the extending direction thereof is substantially parallel to the extending direction or the axis direction of the SCR catalyst 51.

Second Embodiment

The following describes a purification device 401 in the second embodiment. Note that, hereinafter, devices, members, and the like having the same configuration as in the first embodiment will be given the same reference numbers as in the first embodiment, and the descriptions thereof are omitted.

Figure 8A:
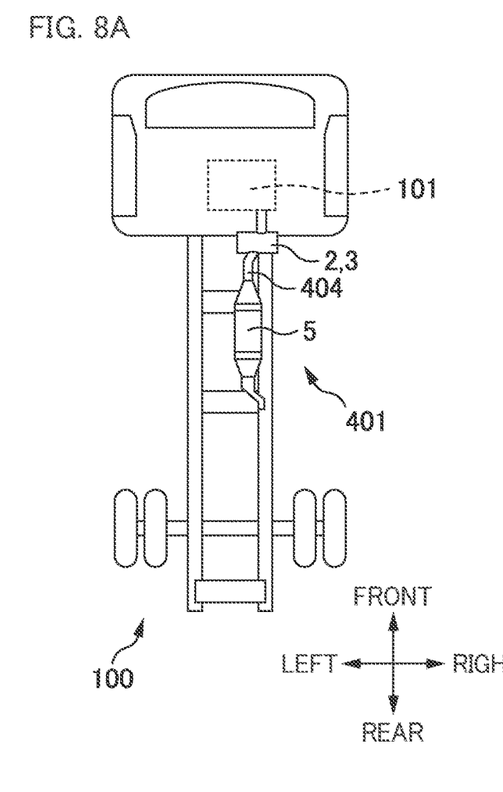
FIG. 8A is a top view schematically illustrating a purification device according to a second embodiment.
Figure 8B:
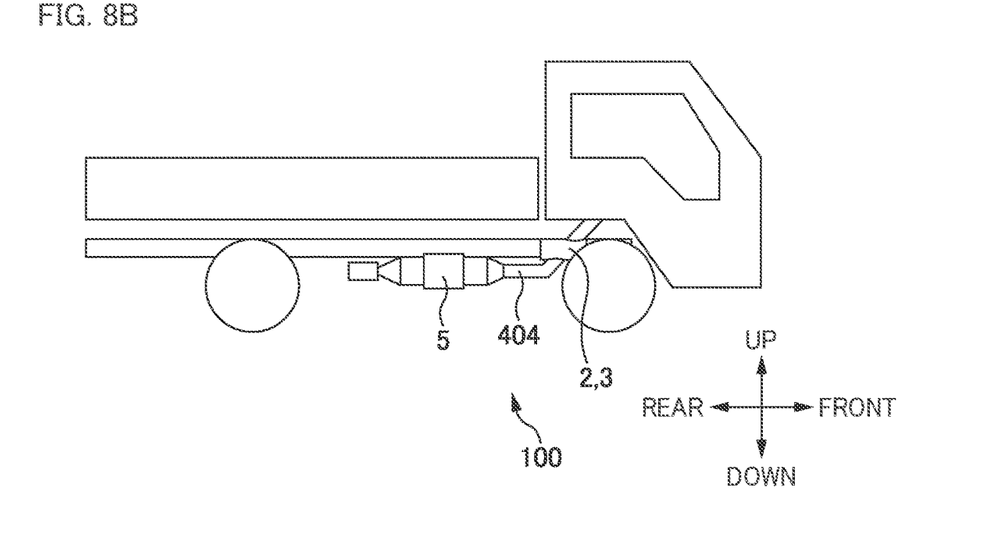
FIG. 8B is a side view schematically illustrating a purification device according to a second embodiment.
Figure 8C:
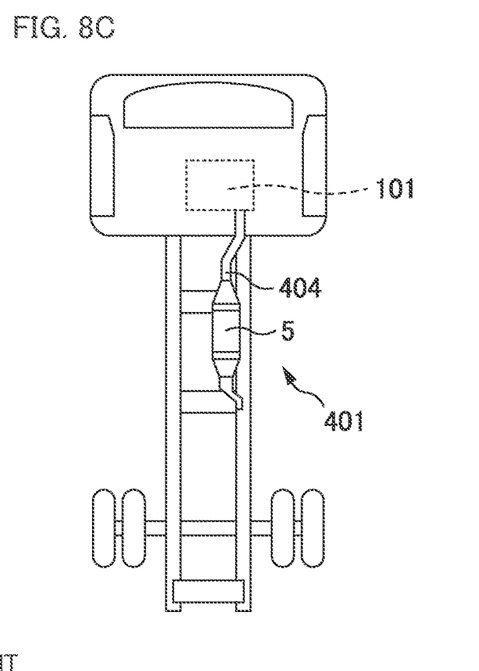
FIG. 8C is a top view schematically illustrating a configuration in which a DOC device and a DPF device are omitted of a purification device according to a second embodiment.

As illustrated in FIGS. 8A to 8C, the purification device 401 mainly comprises the DOC device 2, the DPF device 3, the contact device 404, and the SCR catalyst device 5 having the SCR catalyst 51.

Note that, as illustrated in FIG. 8C, the purification device 401 may have a configuration in which the diesel engine 101 and the SCR catalyst device 5 are connected through the contact device 404, without comprising the DOC device 2 or the DPF device 3. However, the following describes assuming a configuration (FIGS. 8A and 8B) comprising the DOC device 2 and the DPF device 3 unless otherwise specified. The DPF device 3 and the contact device 404 are arranged in the front-rear direction with an interval therebetween.

Figure 9A:
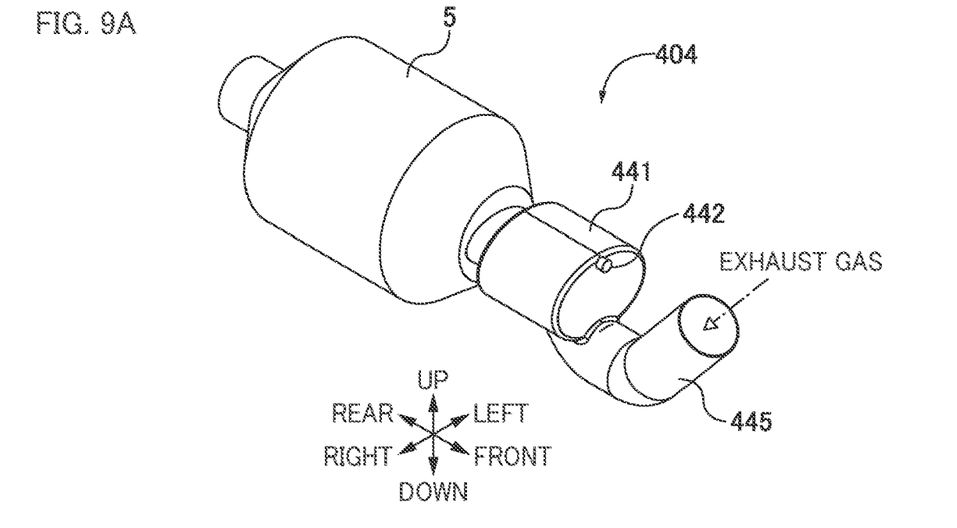
FIG. 9A is a perspective view of a contact device and a catalyst device according to a second embodiment.

The SCR catalyst device 5 is fixed to the chassis of the vehicle 100. The SCR catalyst 51 of the SCR catalyst device 5 is formed in a cylindrical shape, and the SCR catalyst 51 has an axial center 51A, and the axial center 51A extends in the front-rear direction as well as horizontally or substantially horizontally (FIGS. 8B to 9B). The SCR catalyst device 5 is supplied with the exhaust gas from the contact device 404, and promotes the reduction reaction of nitrogen oxides with the SCR catalyst 51.

Figure 9B:
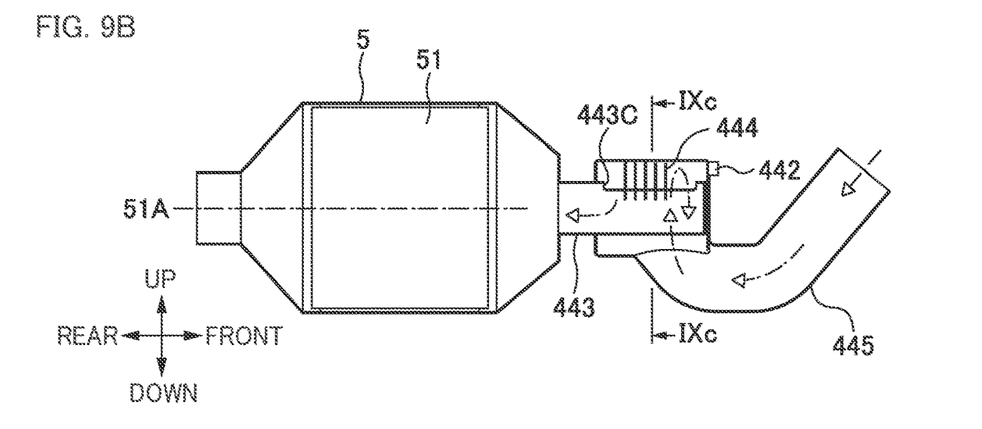
FIG. 9B is a cross section of a contact device and a catalyst device according to a second embodiment.
Figure 9C:
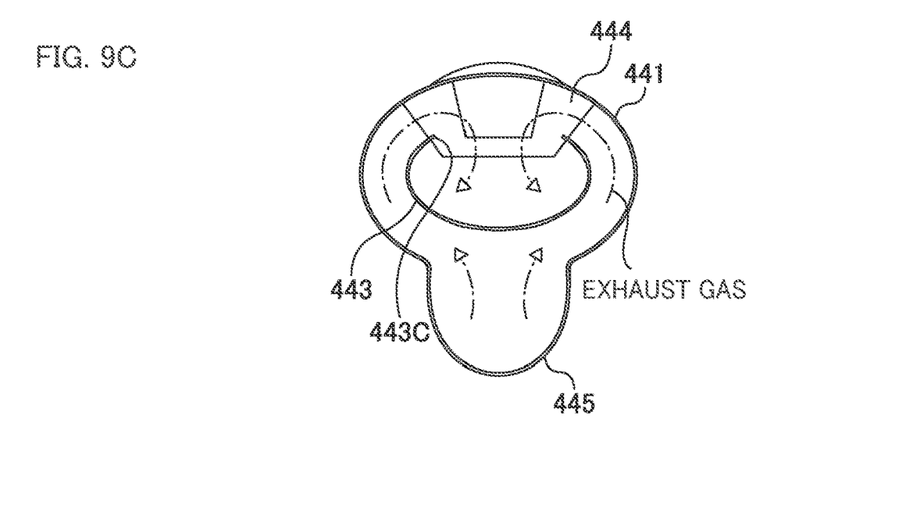
FIG. 9C is a cross section taken along line IXc-IXc of FIG. 9B.

As illustrated in FIGS. 9A to 9C, the contact device 404 comprises a case 441, an injection device 442, an overflow pipe 443, a plurality of baffle plates 444, and piping 445.

The case 441 is a substantially cylindrical member extending in the front-rear direction, and is connected to the discharge portion 33A, to thereby receive the exhaust gas. The case 441, as with the upper chamber 41C such as in the first embodiment, has a function of bringing the exhaust gas into contact with the urea water, in the interior of the case 441.

The injection device 442 is fixed to the upper front end part of the case 441. The injection device 442 has a function of injecting the urea water backward into the case 441. The injection device 442 is located above the overflow pipe 443, and injects the urea water to above the overflow pipe 443.

The overflow pipe 443 is a substantially horizontal pipe extending in the front-rear direction to connect the case 441 and the SCR catalyst device 5, and is formed into a substantially oval shape in cross-section, as illustrated in FIG. 9C. The axial center of the overflow pipe 443 coincides with the axial center 51A.

The front end portion of the overflow pipe 443 is located inside the case 441. An opening 443C is formed in the upper face of the front end portion of the overflow pipe 443, and the overflow pipe 443 and the case 441 communicate with each other through the opening 443C. As illustrated in FIGS. 9B and 9C, in the case 441, a space is formed between the outer peripheral surface of the overflow pipe 443 and the inner surface of the case 441.

A baffle plates 444 is a plate-shaped member extending in the left-right direction and the up-down direction, and is fixed to the internal upper surface of the case 441. A plurality of baffle plates 444 are arranged in and above the opening 443C so as to be aligned in the front-rear direction. The lower end of each of the baffle plates 444 is located inside the overflow pipe 443, and forms a space with the inner surface of the overflow pipe 443 (FIG. 9C).

The piping 445 has a function of connecting the case 441 and the discharge portion 33A and guiding the exhaust gas from the discharge portion 33A to the case 441. In other words, the rear end portion of the piping 445 extends in the direction of intersecting the direction in which the overflow pipe 443 extends, preferably, in the direction perpendicular thereto.

Note that the direction in which the piping 445 and the case 441 are connected can be various directions. As illustrated in FIGS. 9A and 9B for example, the rear end portion of the piping 445 can be bent upward and connected to the case 441. In this case, the exhaust gas goes around the outside of the overflow pipe 443 while moving upward, and moves into the overflow pipe 443 through the opening 443C.

Figure 10A:
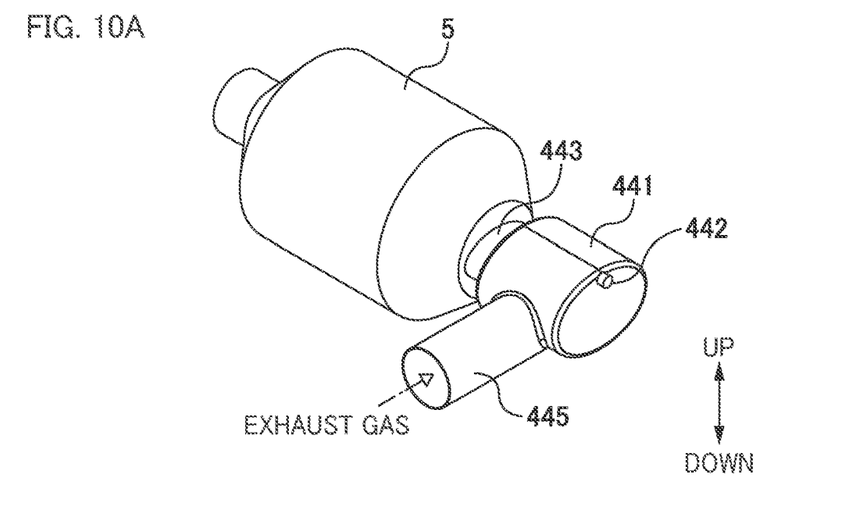
FIG. 10A is a perspective view of a contact device and an SCR catalyst device according to a second embodiment.
Figure 10B:
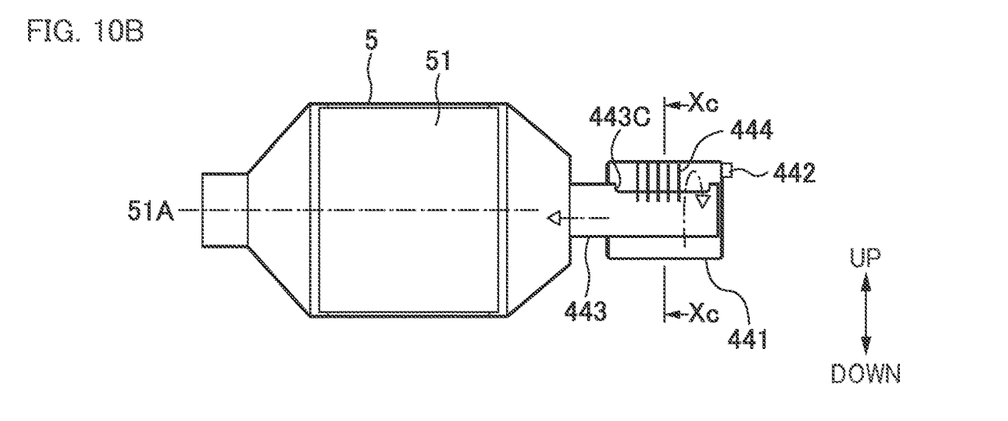
FIG. 10B is a cross section of a contact device and an SCR catalyst device according to a second embodiment.
Figure 10C:
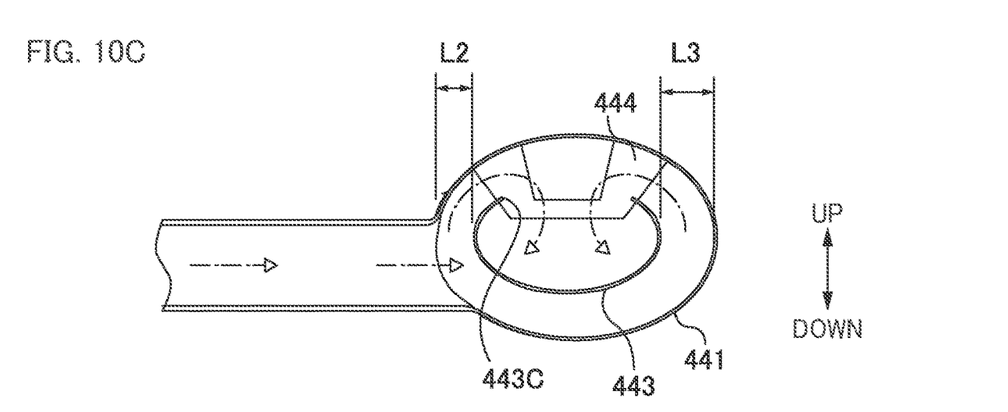
FIG. 10C is a cross section taken along line Xc-Xc of FIG. 10B.
Figure 11:
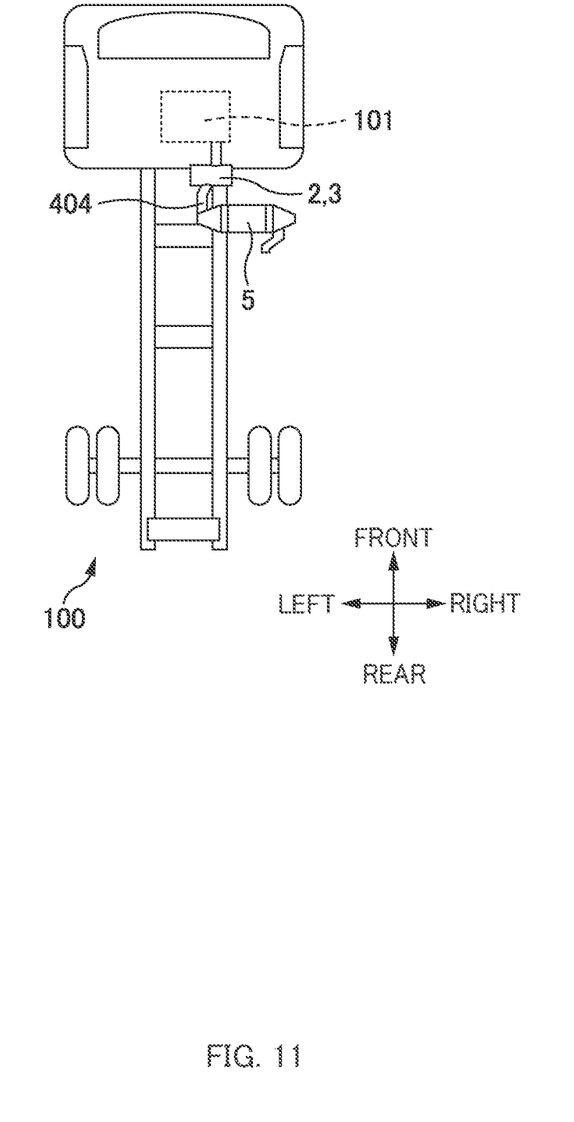
FIG. 11 is a schematic diagram of a purification device according to a second embodiment.

Further, as illustrated in FIGS. 10A to 10C, the rear end portion of the piping 445 can be extended in the left-right direction and connected to the case 441. When such a connection method is employed, it is also possible to install the SCR catalyst 51 such that the axial center 51A extends in the left-right direction as in FIG. 11, for example.

In this case, it is preferable that the length (FIG. 10C, L2) of the space provided between the piping 445 and the inner peripheral surface of the case 441 on the side connected to the piping 445 is set smaller than the length (L3) of a space on the side opposite thereto. This is to adjust the pressure loss caused by the difference in path length, such that the flow rate, flow velocity, or magnitude of the swirling flows of the exhaust gas is brought closer to symmetry. The exhaust gas moves horizontally and goes around the outside of the overflow pipe 443, and moves into the overflow pipe 443 through the opening 443C.

It is desirable that the piping 445 is connected in the direction intersecting with the extending direction of the overflow pipe 43. However, when there is a design constraint, the rear end portion of the piping 445 does not have to extend in the direction of intersecting with the overflow pipe 443. It is also possible to have a configuration in which the rear end portion of the piping 445 extends in the same direction as the direction of the overflow pipe 443, and is connected to the case 441.

Purification of Exhaust Gas

The principle of the purification of the exhaust gas in the purification device 401 is the same as that of the purification device 1 in the first embodiment. In other words, the DOC device 2 oxidizes the nitrogen oxides (NOx) in the exhaust gas, and then the resultant exhaust gas passes through the DPF device 3. In this event, the DPF 34 collects a fine particle component in the exhaust gas and removes it from the exhaust gas. The exhaust gas is discharged from the DPF 34 and flows into the piping 445 of the contact device 4.

When moving from the piping 445 to the case 441, the exhaust gas moves along the direction of the rear end portion of the piping 445. In other words, in an example of FIGS. 9A to 9C, the exhaust gas moves upward, and in an example of FIG. 10A to 10C, the exhaust gas moves substantially horizontally. Inside the case 441, the exhaust gas goes around the outside of the overflow pipe 443, and enters the overflow pipe 443 through the opening 443C. In this event, the exhaust gas goes around the outer circumference of the overflow pipe 443, to thereby produce two swirling flows, and flows in the inside of the overflow pipe 443 toward the SCR catalyst device 5 while maintaining these swirling flows (FIGS. 9B, 10B). The baffle plates 444 and the overflow pipe 443 are heated with the exhaust gas.

At the same time, the urea water is injected from the injection device 442, in the upper chamber 441C. The urea water hits the baffle plates 444, and is sent into the overflow pipe 443 from the opening 443C together with the exhaust gas. Urea contained in the urea water is heated with the baffle plates 444 or the overflow pipe 443, to thereby produce the ammonia. The ammonia and the exhaust gas are mixed and stirred with the swirling flows of the exhaust gas.

The exhaust gas proceeds along the extending direction of the piping 445, and flows in the direction of intersecting with that of the overflow pipe 443. Thus, the flow velocity of the exhaust gas is unlikely to decrease, thereby being able to produce the swirling flows efficiently. This facilitates the mixing the exhaust gas with the ammonia and urea water and stirring them.

The exhaust gas having passed through the overflow pipe 443 reaches the SCR catalyst device 5, and the nitrogen oxides in the exhaust gas is reduced to nitrogen.

Effects

In embodiments and modification examples described above, the purification device 1, 401 has the DPF 34 configured to collect a fine particle component in the exhaust gas discharged from the diesel engine 101 (corresponding to an internal combustion engine), and the DPF device 3, 303 (corresponding to a filter device) having the discharge portion 33A, 133A allowing the exhaust gas having passed through the DPF 34 to be discharged therefrom. Further, the purification device 1, 401 has the contact device 4, 104, 204, 304, 404 that is connected to and communicates with the discharge portion 33A, 133A, and that is configured to bring the reducing agent containing urea into contact with the exhaust gas. Further, the purification device 1, 401 is connected and communicates with the contact device 4, 104, 204, 304, 404, and comprises the catalyst device 5 having the SCR catalyst to promote the reaction between the reducing agent and the nitrogen oxides in the exhaust gas. The contact device 4 has the injection portion (the injection device 42, 442 and the upper chamber 41C, 441C) configured to inject the reducing agent into the exhaust gas, and the overflow pipe 43, 443 (corresponding to a connecting portion) connecting the injection portion and the catalyst device 5, the overflow pipe 43, 443 extending in parallel or substantially in parallel with at least one of the axial center 34A or the axial center 51A.

In a configuration described above, the contact device 4, 104, 204, 404 does not need to be arranged coaxially with the DPF 34. For example, it is possible that the contact device 4, 104, 204, 304 is arranged substantially parallel to the DPF 34, the contact device 404 is arranged below the DPF 34 or substantially parallel to the catalyst device 5. Thus, there are fewer restrictions in designing the device. The size of the region in which the purification system 1, 401 can be arranged is limited, due to the size of the chassis and the width of the vehicle 100, as apparent from FIG. 1 and the like. With a configuration described above, it is possible to reduce the size of the device, while maintaining the exhaust gas purification performance.

In particular, in the contact device 4, 104, 204, 304, it is possible to suppress the dimension of a part protruding from the end of the case 31 in the horizontal direction (given as L1 in FIG. 2A), to thereby reduce the dimension in the horizontal direction. Accordingly, it is possible to install the device even in the vehicle 100 with a small width (see FIGS. 1A and 1B, etc.).

Figure 12:
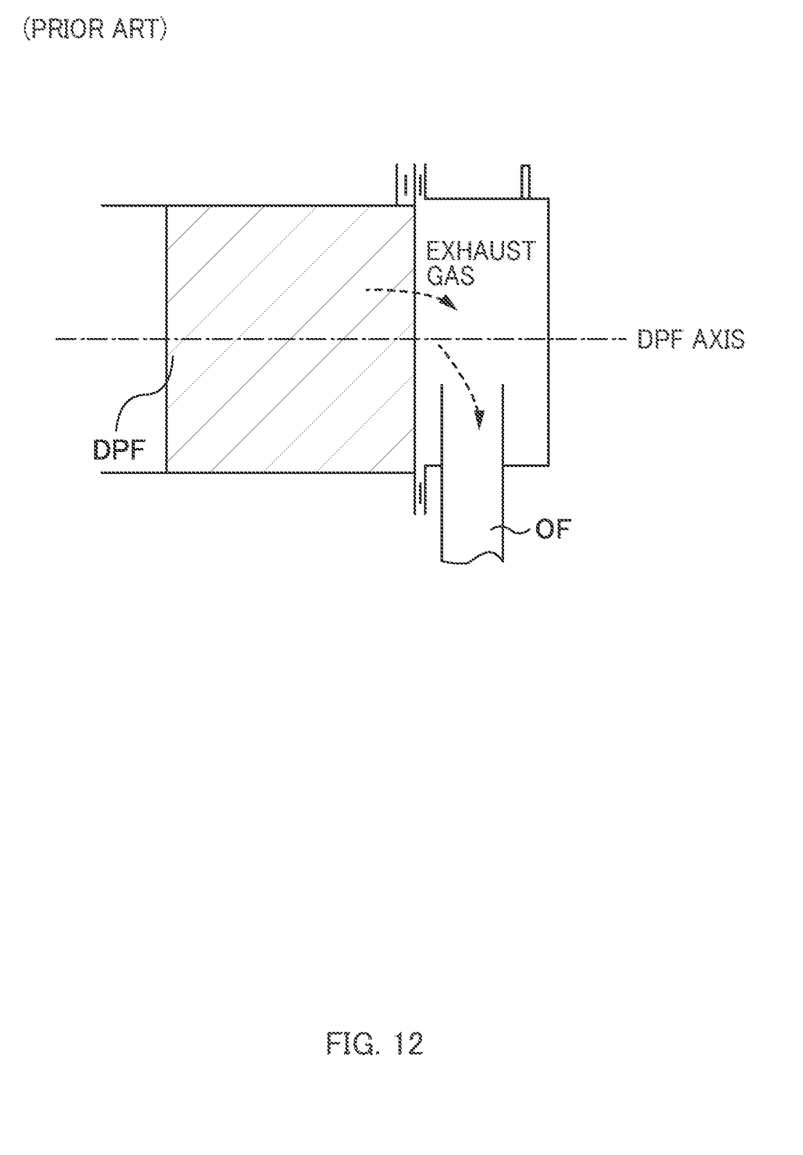
FIG. 12 is a cross section illustrating an arrangement of a DPF and an overflow pipe in a conventional technique.

Meanwhile, the conventional technique has many design constraints, such as the need to arrange the overflow pipe OF in the axis direction of the DPF and further extend it in the direction orthogonal thereto, as illustrated in FIG. 12. With a configuration described above, the purification device 1, 401 can be designed without being subject to such restrictions.

Further, in embodiments and modification examples described above, the overflow pipe 43, 443 extends horizontally or substantially horizontally. Since there is no need to extend the overflow pipe in the up-down direction as in the conventional technique, there are fewer restrictions on the design of the purification device 1, 401.

In embodiments and modification examples described above, the injection device 42, 442 is located above the opening 43C, 443C of the overflow pipe 43, 443.

Since the injection device 42, 442 is located above the overflow pipe 43, 443, which is substantially horizontal, there is no need to arrange the overflow pipe and the injection device side by side as in the conventional technique. Further, since the injection device 42 is arranged above the opening 43C, 443C, and is configured to inject the reducing agent into the upper chamber 41C, the reducing agent flows smoothly into the overflow pipe 43, 443 and is mixed well with the exhaust gas.

In embodiments and modification examples described above, the overflow pipe 43 is located above the DPF 34.

With the overflow pipe 43 being arranged above the DPF 34, it is possible to suppress the dimension of a part protruding from the end of the case 31 in the horizontal direction in the contact device 4, 104, 204.

The contact device 4 comprises a guide portion (the middle chamber 41B, 141B, 241B, the flow path 241D, the piping 445) configured to guide the exhaust gas from the discharge portion 33A. This guide portion guides the exhaust gas in the direction crossing the extending direction of the overflow pipe 43. The exhaust gas may be guided preferably in the direction orthogonal to the extending direction of the overflow pipe 43.

With such a configuration, the flow velocity of the exhaust gas is unlikely to decrease, thereby being able to produce the swirling flows efficiently. It becomes easy to mix the exhaust gas with the ammonia and urea water and stir them.

The cylindrical shell 133 housing the DPF 34 has the discharge portion 133A. The openings 133B penetrating the side wall of the shell 133 are formed in the discharge portion 133A. The exhaust gas can flow outside the shell 133 in the radial direction through the openings 133B.

With such a configuration, it is possible to reduce the dimension of the protruding part of the contact device 4, to thereby achieve a compact configuration.

REFERENCE SIGNS LIST 1, 401 purification device
3, 303 DPF device
4, 104, 204, 304 contact device
5 SCR catalyst device
41, 141, 241, 341 case
41A, 341A lower chamber
41B, 141B, 241B middle chamber
241D flow path
41C, 441C upper chamber
42, 442 injection device
43, 443 overflow pipe
44 baffle plate

The invention claimed is:

1. An exhaust purification apparatus comprising:
a contact device configured to bring a reducing agent into contact with exhaust gas discharged from an internal combustion engine; and
a catalyst device connected to the contact device, the catalyst device having an axis extending in a first direction, the catalyst device having a catalyst to promote a reaction between the reducing agent and nitrogen oxides in the exhaust gas,
the contact device having
an injection portion configured to inject the reducing agent into the exhaust gas, and
a connecting portion of a continuous tubular shape connecting the injection portion and the catalyst device, the connecting portion extending substantially in parallel with the first direction;
wherein the injection portion has an injection chamber through which the exhaust gas passes, and an injection device configured to inject the reducing agent into the injection chamber,
the connecting portion has an end portion having an upper part forming an opening, and
the injection device is configured to inject the reducing agent above the opening.

2. The exhaust purification apparatus according to claim 1, wherein
the connecting portion extends substantially horizontally.

3. The exhaust purification apparatus according to claim 1 further comprising:
a filter device having a filter having an axis extending in a second direction, and a discharge portion allowing the exhaust gas having passed through the filter to be discharged therefrom toward the connecting portion, the filter being configured to collect a fine particle component in the exhaust gas, wherein the axis of the filter is substantially parallel with the axis of the catalyst device.

4. The exhaust purification apparatus according to claim 3, wherein the connecting portion is positioned above the filter.

5. The exhaust purification apparatus according to claim 3, wherein the contact device further has a guide portion configured to guide the exhaust gas discharged from the discharge portion, in a direction crossing an extending direction of the connecting portion.

6. The exhaust purification apparatus according to claim 3, wherein
the filter device further has a cylindrical member that has the discharge portion and that is configured to house the filter, and
the discharge portion has an opening formed therein, the opening penetrating a side wall of the cylindrical member.

* * * * *